US008069548B2

(12) United States Patent
Radgens

(10) Patent No.: US 8,069,548 B2
(45) Date of Patent: Dec. 6, 2011

(54) METHOD OF PRODUCING A VEHICLE TAILIGHT INDICATOR THAT INCLUDES A POLYSTYRENE FOAM CORE BY SHEET METAL BENDING AND FASTENING OF THE POLYSTYRENE FOAM CORE

(76) Inventor: Thomas Howard Radgens, Dearborn, MI (US)

( * ) Notice: Subject to any disclaimer, the term of this patent is extended or adjusted under 35 U.S.C. 154(b) by 576 days.

(21) Appl. No.: 12/321,142

(22) Filed: Jan. 16, 2009

(65) Prior Publication Data
US 2010/0180420 A1    Jul. 22, 2010

(51) Int. Cl.
G02B 7/182    (2006.01)
B60R 1/06     (2006.01)
B23P 13/04    (2006.01)

(52) U.S. Cl. ............... 29/525.11; 29/525.01; 72/379.4; 72/379.2; 362/296.01; 362/296.04; 362/296.05; 362/341

(58) Field of Classification Search ............. 29/525.01, 29/525.11; 72/379.2, 379.4, 389.3; 362/296.01, 362/297, 296.04, 296.05, 346, 341, 355, 362/360
See application file for complete search history.

(56) References Cited

U.S. PATENT DOCUMENTS

| 1,099,751 | A | * | 6/1914 | Kilburn | 362/495 |
|---|---|---|---|---|---|
| 1,177,772 | A | * | 4/1916 | Harken | 362/322 |
| 1,301,150 | A | * | 4/1919 | Martin | 362/341 |
| 1,397,330 | A | * | 11/1921 | Ringham et al. | 40/205 |
| 1,525,114 | A | * | 2/1925 | Yoscary | 359/862 |
| 1,530,351 | A | * | 3/1925 | Charles | 362/341 |
| 1,562,335 | A | * | 11/1925 | Jones | 362/540 |
| 1,596,010 | A | * | 8/1926 | Fiorentino | 362/283 |
| 1,943,978 | A | * | 1/1934 | Luce | 72/349 |
| 1,950,005 | A | * | 3/1934 | Luce | 359/529 |
| 2,222,284 | A | * | 11/1940 | Dehmer | 359/527 |
| 2,271,110 | A | * | 1/1942 | Webster | 359/527 |
| 2,483,202 | A | * | 9/1949 | Jackson | 362/518 |
| 2,833,065 | A | * | 5/1958 | Kies | 40/479 |
| 2,972,559 | A | * | 2/1961 | Allen et al. | 156/322 |
| 3,198,172 | A | * | 8/1965 | Crane, Jr. | 119/430 |
| 3,265,349 | A | * | 8/1966 | Hamrick | 249/177 |
| 3,467,345 | A | * | 9/1969 | Windecker | 244/105 |
| 3,731,055 | A | * | 5/1973 | Kerchner et al. | 392/423 |
| 3,773,600 | A | * | 11/1973 | Rudnev | 156/551 |
| 3,836,764 | A | * | 9/1974 | Szer | 362/355 |
| 4,241,555 | A | * | 12/1980 | Dickens et al. | 52/454 |
| 4,353,179 | A | * | 10/1982 | Jennings | 40/479 |
| 4,524,405 | A | * | 6/1985 | Heard | 362/18 |
| 4,570,203 | A | * | 2/1986 | Daniels et al. | 362/16 |
| 4,608,773 | A | * | 9/1986 | White | 40/606.01 |
| 4,774,794 | A | * | 10/1988 | Grieb | 52/309.7 |
| 4,811,173 | A | * | 3/1989 | Johnson | 362/540 |
| 4,926,676 | A | * | 5/1990 | Bailey et al. | 72/389.3 |

(Continued)

*Primary Examiner* — David Bryant
*Assistant Examiner* — Jason L Vaughan

(57) ABSTRACT

A vehicle taillight indicator which provides an easy way for a driver to check the taillights of his or her vehicle on a regular basis, from within the vehicle, is composed of an elongated V shaped housing with two V shaped end covers with attached mounting brackets and the edge opposite the V angle of each end cover curved to accommodate an elongated rectangular shaped convex reflector which is viewable in the side opposite the V shaped angle of the housing. The taillight indicator is fastened vertically to an object so that its convex reflector is observed in the rear view mirror or side view mirror of a vehicle. Each operating taillight of a vehicle is reflected as a vertical red line in the convex reflector. A vehicle with two operating taillights will reflect two parallel vertical red lines in the convex reflector of the taillight indicator.

2 Claims, 1 Drawing Sheet

U.S. PATENT DOCUMENTS

| | | | |
|---|---|---|---|
| 4,989,121 A * | 1/1991 | Hall | 362/540 |
| 5,230,557 A * | 7/1993 | Kronen | 362/541 |
| 5,289,356 A * | 2/1994 | Winston | 250/580 |
| 5,349,798 A * | 9/1994 | Gross | 52/405.1 |
| 5,568,680 A * | 10/1996 | Parker | 29/557 |
| 5,792,552 A * | 8/1998 | Langkamp et al. | 428/309.9 |
| 5,818,331 A * | 10/1998 | Rabinovich et al. | 340/438 |
| 5,966,885 A * | 10/1999 | Chatelain | 52/309.4 |
| 6,050,012 A * | 4/2000 | Greenfield | 40/564 |
| 6,250,003 B1 * | 6/2001 | Phinney | 40/607.12 |
| 6,256,960 B1 * | 7/2001 | Babcock et al. | 52/592.1 |
| 6,378,733 B1 * | 4/2002 | Boonzaier | 222/105 |
| 6,408,594 B1 * | 6/2002 | Porter | 52/794.1 |
| 6,450,657 B1 * | 9/2002 | Testa et al. | 362/604 |
| 6,464,378 B1 * | 10/2002 | Reed et al. | 362/320 |
| 6,553,803 B1 * | 4/2003 | Heingartner et al. | 72/31.1 |
| 6,751,993 B2 * | 6/2004 | Sekita et al. | 72/31.1 |
| 7,284,869 B1 * | 10/2007 | Weaver | 359/872 |
| 7,640,775 B2 * | 1/2010 | Durney | 72/324 |
| 7,827,714 B2 * | 11/2010 | Howard et al. | 40/572 |
| 2007/0171652 A1 * | 7/2007 | Gaines et al. | 362/346 |
| 2007/0171653 A1 * | 7/2007 | Bingaman | 362/346 |

* cited by examiner

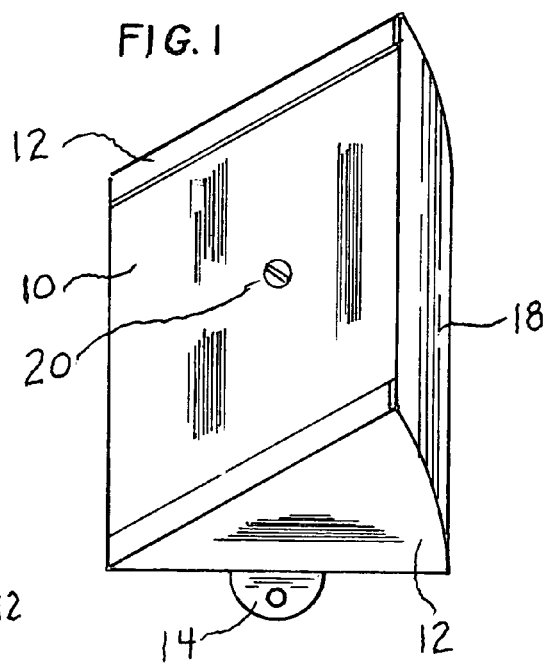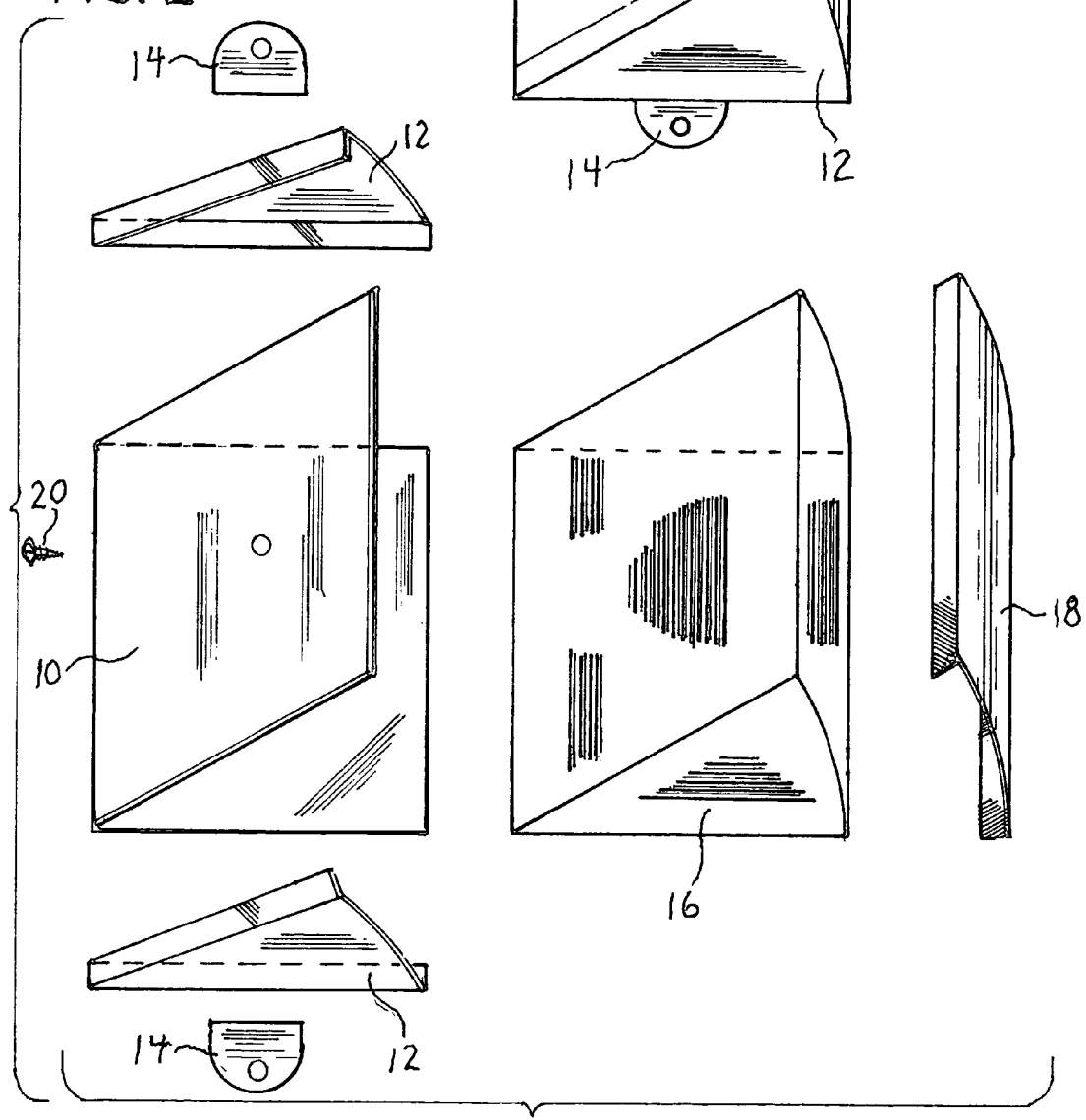

METHOD OF PRODUCING A VEHICLE TAILIGHT INDICATOR THAT INCLUDES A POLYSTYRENE FOAM CORE BY SHEET METAL BENDING AND FASTENING OF THE POLYSTYRENE FOAM CORE

BACKGROUND OF THE INVENTION

This invention relates to automobile safety generally and more particularly to a taillight indicator to observe whether the taillights of a vehicle are working There are many vehicles on the road in which the operators are unaware that at least one taillight has burned out This is a dangerous situation and is the cause of many rear end collisions There is presently no simple device for the operator of a vehicle to regularly check whether the taillights of a vehicle are working

SUMMARY OF THE INVENTION

I have invented a simple taillight indicator which is fastened vertically to an object so that the convex reflector of the taillight indicator is viewable in the rear view mirror or side view mirror of a vehicle Each taillight of the vehicle is reflected as a vertical red line in the convex reflector of the taillight indicator If a vehicle has two operating taillights, there will be two parallel vertical red lines in the convex reflector of the taillight indicator A vehicle with two taillights which reflects only one vertical red line in the convex reflector of the taillight indicator has one taillight burned out which should be replaced

BRIEF DESCRIPTION OF THE DRAWING

FIG. 1 is a perspective view of the assembled taillight indicator showing the housing 10, end cover 12, mounting bracket 14, reflector 18, and fastening screw 20

FIG. 2 is an exploded view of the taillight indicator showing the relationship of the housing 10, two end covers 12, two mounting brackets 14, polystyrene foam insert 16, reflector 18 and fastening screw 20 to produce the taillight indicator

DETAILED DESCRIPTION OF THE INVENTION

A vertically mounted vehicle taillight indicator provides an easy way for drivers to check the taillights of their vehicles on a regular basis, from within their vehicles, by observing the number of parallel, vertical red lines in the convex reflector of the indicator The convex reflector which I used to create the taillight indicator is sheet aluminum The elongated cylindrical shaped convex aluminum reflector of the taillight indicator which is vertically mounted does not mirror images but reflects multiple light sources as parallel vertical lines Referring to the drawings, FIG. 1 shows the vertical taillight indicator assembled with the housing 10, end covers 12, mounting bracket 14, convex reflector 18, and fastening screw 20 FIG. 2 shows the relationship of parts to construct the vehicle taillight indicator The housing 10 has two end covers 12, with two mounting brackets 14, polystyrene foam insert 16, elongated cylindrical shaped convex reflector 18 and fastening screw 20

The taillight indicator is made by folding a rectangular piece of sheet metal at the mid-point of its length to a V shaped angle creating the housing 10 with two V shaped open ends and an elongated rectangular shaped open side The two open ends of the housing 10 are closed by V shaped end covers 12 with sides adjacent to their V shaped angles folded inward and soldered to the housing 10 The edge of each end cover 12 opposite its V shaped angle is cut to a circular shape to accommodate the elongated cylindrical shaped convex reflector 18 Mounting brackets 14 are soldered to each end cover for installation of the taillight indicator The convex reflector 18 is made by cutting a semi-reflective piece of sheet metal to a rectangular shape and bending the sheet metal lengthwise to an elongated cylindrical convex shape The convex reflector 18 is attached to a preformed polystyrene foam insert 16 which fits within the housing 10 and is secured within the housing 10 by means of a sheet metal screw 20

A user of the taillight indicator fastens the taillight indicator vertically to an object by means of the brackets 14 of the housing 10 and makes sure that the convex reflector 18 of the taillight indicator is viewable in the rear view mirror or side view mirror of a vehicle and checks the taillights by observing a vertical red line in the convex reflector of the taillight indicator for each operating taillight of the vehicle Based upon the foregoing discussion I am of the opinion that my invention has fulfilled a long-felt need in the field of automobile safety and that I have made a valuable contribution to the related art; however while the invention is described with reference to the structural details of a single embodiment, the principles involved are susceptible of numerous other practical adaptations.

Therefore I claim:

1. A method of producing a vehicle taillight indicator comprising the steps of:

folding a rectangular piece of sheet metal at the mid-point of its length to a V shaped angle to create a housing with two V shaped open ends and one elongated rectangular shaped open side;

cutting two pieces of sheet metal to fabricate end covers of a similar shape as the V shaped open, ends of the housing but slightly larger;

cutting the two V shaped end covers opposite their V shaped angle to a circular shape;

folding the edges adjacent to the V shaped angle of each end cover inward;

fastening each end cover to the housing thereby closing the two V shaped open ends;

attaching a mounting bracket to each end cover;

molding polystyrene foam to fit within the elongated rectangular shaped open side of the V shaped housing;

forming the polystyrene foam opposite its V shaped angle to an elongated, cylindrical shaped convex curvature to match the circular shape of the end covers;

cutting a piece of semi-reflective sheet metal to a rectangular shape similar to the elongated polystyrene foam insert;

bending the semi-reflective rectangular piece of sheet metal lengthwise to fit the elongated cylindrical shaped convex curvature of the polystyrene foam insert to form an elongated convex reflector;

attaching said convex reflector over the elongated cylindrical shaped convex side of the polystyrene foam insert;

placing the V shaped polystyrene foam insert within the housing with the attached elongated convex reflector showing; and fastening the polystyrene foam insert within the housing with a sheet metal screw, thereby forming the taillight indicator.

2. The method as claimed in claim 1, further comprising:
fastening the taillight indicator vertically to an object by means of the brackets of the housing;
ensuring that the convex reflector of the taillight indicator is viewable in the rear view mirror or side view mirror of a vehicle; and
checking the taillights of the vehicle by observing a vertical red line in the convex reflector of the taillight indicator for each operating taillight of the vehicle.

* * * * *